United States Patent [19]

Rudi et al.

[11] Patent Number: 4,636,890
[45] Date of Patent: Jan. 13, 1987

[54] MAGNETIC TAPE RECORDER

[75] Inventors: Guttorm Rudi, Fjellhamar; Jan-Erik Dilling, Oslo, both of Norway

[73] Assignee: Tandberg Data A/S, Oslo, Norway

[21] Appl. No.: 587,579

[22] Filed: Mar. 8, 1984

[30] Foreign Application Priority Data

May 16, 1983 [DE] Fed. Rep. of Germany ....... 3317720

[51] Int. Cl.$^4$ .......................... G11B 5/54; G11B 21/12
[52] U.S. Cl. ..................................... 360/96.5; 360/105
[58] Field of Search .............................. 360/105, 96.5

[56] References Cited

U.S. PATENT DOCUMENTS

| | | | |
|---|---|---|---|
| 3,959,821 | 5/1976 | Nardino | 360/105 |
| 3,976,262 | 8/1976 | Kennedy | 360/96.4 |
| 3,987,486 | 10/1976 | Ito et al. | 360/96.5 |
| 4,133,014 | 1/1979 | Righi | 360/105 |
| 4,188,647 | 2/1980 | Tanaka | 360/105 |
| 4,344,097 | 8/1982 | Takai | 360/96.6 |
| 4,396,963 | 8/1983 | Wright | 360/105 |
| 4,491,889 | 1/1985 | Tsuchiya | 360/105 |
| 4,498,112 | 2/1985 | Georgens et al. | 360/96.5 |
| 4,559,571 | 12/1985 | Olmsted et al. | 360/105 |
| 4,573,091 | 2/1986 | Barton et al. | 360/96.5 |

Primary Examiner—Robert S. Tupper
Attorney, Agent, or Firm—Hill, Van Santen, Steadman & Simpson

[57] ABSTRACT

In an exemplary embodiment a cassette provided with the magnetic tape is inserted in a longitudinal direction into an insertion channel. During and/or after the insertion of the cassette, a magnetic head carrier provided with a magnetic head is pivoted from an idle position into an operating position in which the magnetic head contacts the magnetic tape. The pivotal movement is effected by a lever linked to the magnetic head carrier. The lever is actuated by a connecting rod which is linked to a cover for closing the insertion channel. The movement of the lever by the connecting rod ensues via a rotatably mounted swivel arm. When the cover for the insertion channel is opened, the magnetic head is pivoted back into its idle position and the cassette is simultaneously partially ejected from the magnetic tape recorder by the swivel arm.

13 Claims, 2 Drawing Figures

MAGNETIC TAPE RECORDER

CROSS-REFERENCE TO RELATED APPLICATION

Reference is made to a prior filed pending application for patent in the name of Guttorm Rudi, U.S. Ser. No. 555,151 filed Nov. 25, 1983, entitled "MAGNETIC TAPE RECORDER", and which corresponds to German Patent Application P No. 32 44 165.7, filed Nov. 29, 1982.

BACKGROUND OF THE INVENTION

The invention relates to a magnetic tape recorder wherein a cassette for the storage of data signals can be placed into operative association with a magnetic head which is capable of data recording and/or playback operation. The magnetic tape contained in the cassette can be moved past the magnetic head with the use of a capstan drive energized by a tape drive motor.

Magnetic tape recorders are already generally known wherein data are recorded on a magnetic tape contained in the cassette and are read from said magnetic tape. When recording digital data, a cassette is employed which contains a capstan idler and a pivotably disposed dust cover in addition to the reels for the magnetic tape. The cassette is usually inserted transversely into an insertion channel of the magnetic tape recorder. The dust cover is thereby automatically opened. For the purpose of driving the magnetic tape, a tape capstan presses said tape against the capstan idler. Further, a magnetic head contacts the magnetic tape at the area exposed by the dust cover in order to record or read the data.

A magnetic tape recorder is disclosed in the earlier German patent application P No. 32 44 165.7 corresponding to U.S. Ser. No. 555,151 wherein the cassette is inserted in a longitudinal direction. The drive capstan driven by the tape drive motor and a magnetic head are disposed at one side of the insertion channel. While the cassette is being inserted, the dust cover at the cassette is hinged out by means of a pivot arrangement as the cover covering the insertion channel is closed, to expose a tape scanning location. The magnetic head is disposed on a magnetic head carrier pivotable about an axis, said magnetic head carrier pivoting to shift the magnetic head into the scanning location in place of the dust cover after it has been opened, for scanning of the magnetic tape. After the cover for the insertion channel is closed, the cassette is locked in a defined work position. When the cassette is being removed, the magnetic head is pivoted back out of its operating position into an idle position after the cover for the insertion channel has been opened. Subsequently, the dust cover is hinged back into the cassette. In this earlier magnetic tape recorder, the pivoting of the magnetic head carrier and the ejection of the cassette are effected with the use of springs.

SUMMARY OF THE INVENTION

The object of the invention is to improve such a magnetic tape recorder to the effect that the sequences upon insertion and upon removal of the cassette are precisely defined and, in particular, the movement of the magnetic head carrier is precisely definable.

Given the magnetic tape recorder of the type initially defined, the object is resolved by providing a connecting means, one end of which is connected to an insertion means in the form of a cover for the insertion channel, and the other end of which is connected to a swivel means. The swivel means also connects to a lever which in turn connects to the pivotable magnetic head. As the cover is closed, means are actuated for opening the dust cover and simultaneously the magnetic head is swung from an idle position behind the dust cover into an operating position. The swivel means also preferably serves as a stop during initial insertion of the cassette prior to closing the cover and placing the cassette in its final operating position. Additionally, during opening of the cover, the swivel means causes the cassette to reject.

The magnetic tape recorder according to the invention has the advantage that a precise definition of the motion sequences is possible with low outlay and that a re-adjustment is not necessary.

The magnetic tape recorder exhibits high protection against malfunction. For example, it is not possible to place the cassette into its operating position when the cover is open due to a self-blocking position of a swivel arm.

An exemplary embodiment of the inventive tape recorder is explained in greater detail below with reference to the accompanying drawing sheets; and other objects, features and advantages will be apparent from this detailed disclosure and from the appended claims.

DETAILED DESCRIPTION

Figure 1:
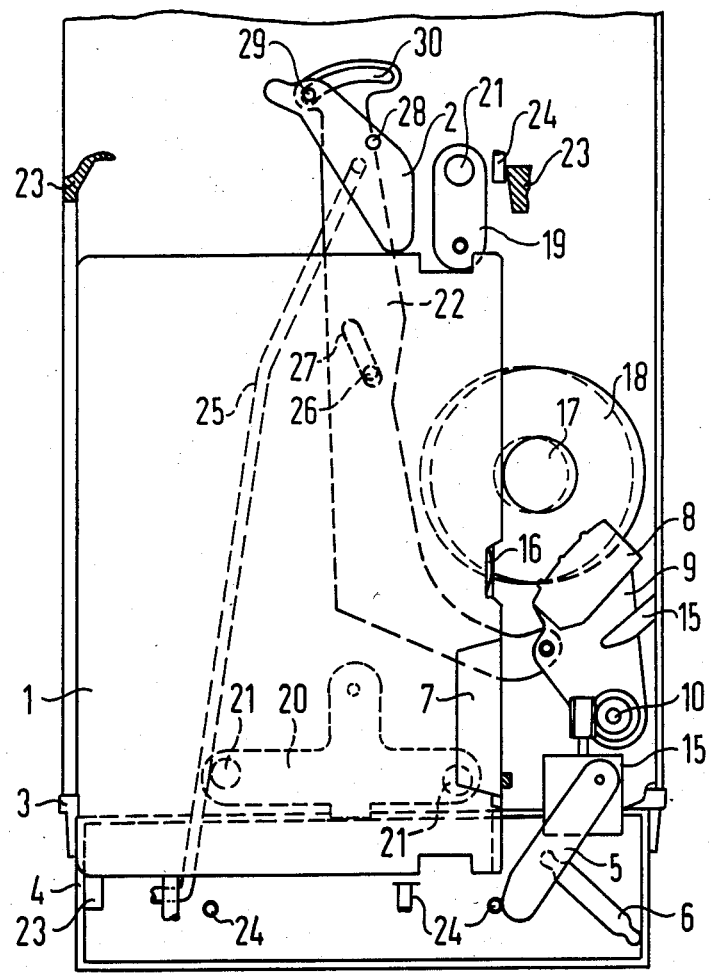
FIG. 1 is a diagrammatic plan view of the magnetic tape recorder given an open cover.

The magnetic tape recorder or magnetic tape transducer system illustrated in FIG. 1 exhibits an insertion channel for receiving a cassette 1. The cassette is shown in a partially inserted position. The cassette 1 is inserted into the insertion channel in a longitudinal direction and is held in the partially inserted position shown in FIG. 1 by means of a swivel arm 2 that is situated in a self-blocking position at the back end of the insertion channel. The housing 3 of the magnetic tape transducer unit is provided with a pivotable cover 4 that is shown in its open position in FIG. 1. The magnetic tape transducer unit contains a pivot arrangement formed of the swivel arm 5 and a connecting rod 6, said pivot arrangement serving the purpose of automatically opening the dust cover 7 of the cassette 1. The swivel arm 5 is rotatably mounted for movement about an axis 5a. One end of the connecting rod 6 is coupled with said swivel arm 5 and its other end is disposed at the inside of the cover 4. A magnetic head 8 is secured to a magnetic head carrier 9 that is pivotable about a shaft 10. Given an open cover 4, the magnetic head 8 is situated in the illustrated idle position. It was brought into this position by a lever 22 while the cover 4 was being opened, said lever 22 being connected to the cover 4 via the swivel arm 2 and a connecting rod 25. The lever 22 is rotatable around a pin 26 disposed at the lower side of the magnetic tape transducer unit and is also displaceably mounted as a consequence of the oblong hole 27 in lever 22. The swivel arm 2 is rotatable about a pin 28 and the traction mechanism 25 acts upon it. The swivel arm 2 also contains a pin 29 that is displaceably engaged in an arc-like opening 30 of the lever 22.

Figure 2:
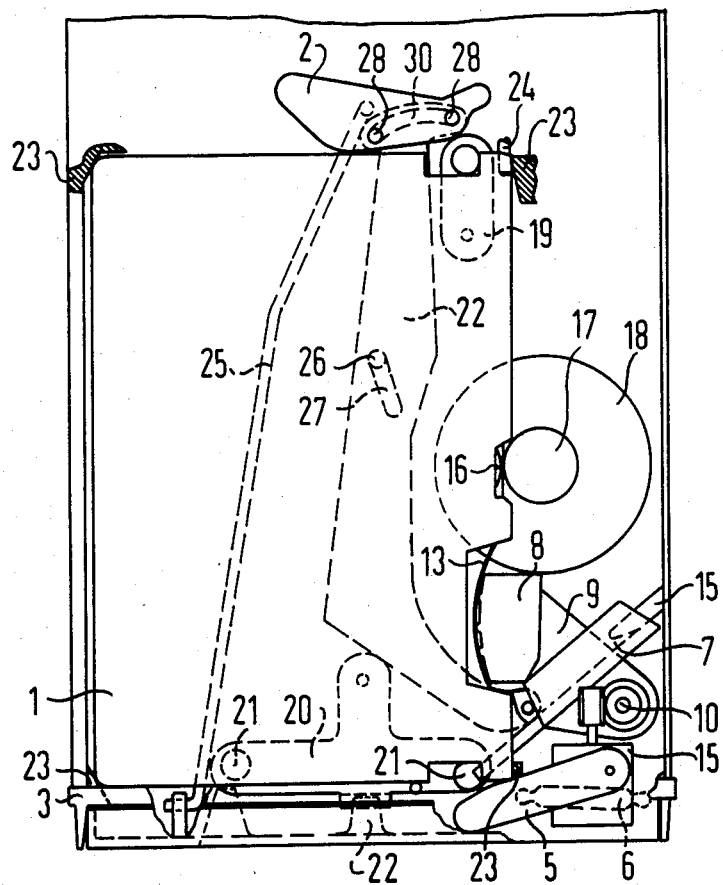
FIG. 2 is a diagrammatic plan view of the magnetic tape recorder given a closed cover.

Further details are described below with reference to the plan view illustrated in FIG. 2.

When the cover 4 is closed, the free end of the swivel arm 5 presses against a lever like extension 7a of the dust cover 7 and hinges said dust cover 7 away from the cassette. Further, the tie rod 25 turns the swivel arm 2 about the pin 28 (clockwise as viewed in FIG. 2) while the cassette 1 is simultaneously being inserted into the magnetic tape transducer unit. With the rotation of the swivel arm 2, the lever 22 is also turned (clockwise as viewed in FIG. 2) around the pin 26 and is simultaneously displaced to the extend permitted by the opening 27. Since the magnetic head carrier 9 is coupled to the other end of the lever 22 as indicated at 9a, said carrier 9 is pivoted by the motion of the lever 22 from its idle position into the operating position illustrated in FIG. 2. The lever 22 is thereby pressed against a stop by the connecting rod 25, whereby the connecting rod 25 is deformed such that it acts like a spring in order to press the lever 22 against the said stop.

The magnetic head 8 is displaceable by a driver motor 15 in the direction of the shaft 10 and, thus perpendicular to the running direction of the magnetic tape 13 in order to be able to position the magnetic head 8 in scanning relation to different tracks of the magnetic tape 13. The dust cover 7 is held in its open position by a detent 15'. Said detent 15' can also serve as a detent for the magnetic head carrier 9 in its idle position.

A capstan idler 16 is disposed inwardly offset at a recess 1a in the cassette 1. The capstan 17 and the tape drive motor 18 are therefore pivotably designed so that the capstan 17 rolls along the long side of the cassette 1 as illustrated in FIG. 1 when the cassette 1 is inserted or withdrawn. The tape drive motor 18 is expediently mounted for pivotal movement on an axis indicated at 18a intersecting its center of gravity, the tape drive motor 18 and capstan 17 being resiliently biased toward the cassette 1.

In the final position of the cassette 1, leaf springs 19 and 20 provided with balls 21 press from below against said cassette 1. The leaf spring 19 presses against the cassette 1 with a predetermined pressure whereas the leaf spring 20 presses against the cassette 1 with a lower pressure. When the cover 4 has been completely closed, a wedge 200 on the cover 4 presses against the leaf spring 20 so that this leaf spring presses toward the cassette 1 with the same pressure as the leaf spring 19. The balls 21 thereby engage in corresponding recesses of the cassette 1. Corresponding surfaces 23 are provided at locations of the insertion channel allocated to the four corners of the cassette 1 for the purpose of locking the cassette in the final position. Further, reference pins 24 are provided for defining a plane of reference of the magnetic tape 13. One of said reference pins is disposed at the back end of the insertion channel whereas three reference pins are disposed at the inside of the cover 4 and contact the cassette 1 when the cover 4 is closed.

As the cover 4 is being opened, the swivel arm 9 is again turned under the influence of the tie rod 25 and the lever 22 displaces the magnetic head carrier 9 back into its idle position. At the same time, the swivel arm 2 partially ejects the cassette 1 from the magnetic tape recorder, as shown in FIG. 1. The cassette 1 can be removed from the magnetic tape recorder in this position. An insertion of the cassette 1 into its work position is not possible, due to the self-blocking position of the swivel arm 2. In order to insert said cassette, the cover 4 must first be closed again.

It will be apparent that many modifications and variations may be made without departing from the scope of the teachings and concepts of the present invention.

We claim as our invention:

1. A magnetic tape transducer system for use with a cassette containing a tape and having a drive opening and a tape scanning location protected by a pivotable dust cover at a front end, and first and second lateral ends substantially perpendicular to the front end, comprising:

an insertion channel means for receiving the cassette first lateral end leading, the insertion channel means having a back end adjacent the inserted first lateral end when the cassette is fully inserted and a front side parallel to an insertion direction of the cassette;

a drive means positioned at said front side of the insertion channel means for interaction with the cassette drive opening;

a magnetic head also at said front side and positioned to interact with the scanning location of the cassette;

manually activatable cassette insertion means for inserting a partially inserted cassette into a final position in the insertion channel means;

means coupled to the insertion means for pivoting the pivotable cassette dust cover from a closed position to an open position as the cassette is inserted into the insertion channel means;

a connecting means having a first end connected to the insertion means and an opposite end connected to a swivel means;

a lever means connected to the swivel means;

pivotable magnetic head carrier means mounting the magnetic head and being connected to the lever means; and said connecting means, swivel means, and lever means together forming means for simultaneously pivoting the magnetic head into operative position simultaneously as the insertion means is inserting the cassette into its final position and the dust cover is pivoting open, the magnetic head pivoting into the operative position behind the dust cover with precise definitional movement.

2. A system according to claim 1 wherein said lever means has one end connected to the swivel means and the other end connected to the magnetic head carrier means, and wherein means are provided allowing pivoting and displacement motion of the lever means when acted upon by the swivel means.

3. A system according to claim 1 wherein said swivel means, prior to manual activation of the insertion means to insert the cassette prevents insertion of the cassette into its final position by blocking further insertion of the cassette into the insertion channel means, and when ejecting a cassette by operating the manual insertion means, said swivel means partially ejecting the cassette from its final position in the insertion channel means.

4. A system according to claim 1 wherein the connecting means comprises a connecting rod having one end connected to the insertion means, the other end connected to the swivel means, and wherein the lever means has one end connected to the swivel means and the other end connected to the magnetic head carrier means.

5. A system according to claim 1 wherein the insertion means comprises a cover which covers at least a portion of an entrance to the insertion channel means.

6. A system according to claim 5 wherein the means for pivoting the dust cover comprises a swivel arm means for pivoting as the cover is closed, said swivel arem means abutting against a portion of the dust cover to pivot it open.

7. A system according to claim 1 wherein the lever means has a substantially central oblong-shaped hole and wherein a pivoting means rides in said hole so as to allow both displaceable and pivotable motion of the lever means.

8. A system according to claim 1 wherein the lever means has an oblong opening at one end which receives a pin mounted on the swivel means, wherein an additional oblong aperture is provided centrally of the lever means which receives a pivoting pin, and wherein the magnetic head carrier means is connected at the opposite end of the lever means.

9. A system according to claim 1 wherein a leaf spring means is provided adjacent an insertion end of the insertion channel means for pressing against the cassette in its final position.

10. A system according to claim 1 wherein a leaf spring means is provided adjacent the back end of the insertion channel means for pressing against the cassette in its final position.

11. A system according to claim 1 wherein the means for pivoting the dust cover comprises a connecting rod having one end connecting to the insertion means and the other end connecting to a swivel arm having one end connecting to a rotational axis member and the other end abutting a position of the dust cover.

12. A magnetic tape transducer system for use with a cassette containing a tape and having a drive opening and a tape scanning location protected by a pivotble dust cover at a front end, and first and second lateral ends substantially perpendicular to the front end, comprising:

an insertion channel means for receiving the cassette first lateral end leading, the insertion channel means having a back end adjacent the inserted first lateral end when the cassette is fully inserted and a front side parallel to an insertion direction of the cassette;

a drive means positioned at said front side of the insertion channel means for interaction with the cassette drive opening;

a magnetic head assembly also at said front side and positioned to interact with the scanning location of the cassette;

a manually activatable cover means for inserting a partially inserted cassette into a final position in the insertion channel means when closed and for causing an ejection of the cassette therefrom when opened;

means coupled to the insertion means for pivoting the pivotable cassette dust cover from a closed position to an open position as the cassette is inserted into the insertion channel means;

a connecting means having a first end connected to the insertion means and an opposite end connecting to a linking means;

a lever means connected to the swivel means;

pivotable magnetic head carrier means mounting the magnetic head for pivoting in a horizontal plane parallel with a tape running direction at the scanning location, the carrier means being connected to the lever means; and said connecting means, linking means, and lever means together forming means for simultaneously pivoting the magnetic head into operative position simultaneously as the insertion means is inserting the cassette into its final position and the dust cover is pivoting open, the magnetic head pivoting into the operative position behind the dust cover with precise definitional movement.

13. A magnetic tape transducer system for use with a cassette containing a tape and having a drive opening and a tape scanning location protected by a pivotable dust cover at a front end, and first and second lateral ends substantially perpendicular to the front end, comprising:

an insertion channel means for receiving the cassette first lateral end leading, the insertion channel means having a back end adjacent the inserted first lateral end when the cassette is fully inserted and a front side parallel to an insertion direction of the cassette;

a drive means positioned at said front side of the insertion channel means for interaction with the cassette drive opening;

a magnetic head also at said front side and positioned to interact with the scanning location of the cassette;

manually activatable cassette insertion means for inserting a partially inserted cassette into a final position in the insertion channel means;

means coupled to the insertion means for pivoting the pivotable cassette dust cover from a closed position to an open position as the cassette is inserted into the insertion channel means;

a connecting means having a first end connected to the insertion means and an opposite end connected to a linking means;

a lever means connected to the linking means;

movable magnetic head carrier means mounting the magnetic head and being connected to the lever means;

said linking means in a first position prior to activation of the insertion means for inserting the cassette into its final position, blocking further insertion of the cassette into the insertion channel means; and said connecting means, swivel means, and lever means together forming means for simultaneously pivoting the magnetic head into operative position simultaneously as the insertion means is inserting the cassette into its final position and the dust cover is pivoting open, the magnetic head pivoting into the operative position behind the dust cover with precise definitional movement.

* * * * *